United States Patent [19]
Koenig

[11] Patent Number: 5,923,874
[45] Date of Patent: Jul. 13, 1999

[54] RESOURCE MEASUREMENT FACILITY IN A MULTIPLE OPERATING SYSTEM COMPLEX

[75] Inventor: Dieter Koenig, Herrenberg, Germany

[73] Assignee: International Business Machines Corporation, Armonk, N.Y.

[21] Appl. No.: 08/847,765

[22] Filed: Apr. 22, 1997

Related U.S. Application Data

[63] Continuation of application No. 08/359,130, Dec. 19, 1994, abandoned.

[30] Foreign Application Priority Data

Feb. 22, 1994 [EP] European Pat. Off. .............. 94102636

[51] Int. Cl.⁶ .................................................... G06F 11/34
[52] U.S. Cl. .............................................................. 395/670
[58] Field of Search ................................ 395/670, 200.3, 395/200.31, 200.33, 200.49, 674, 704

[56] References Cited

U.S. PATENT DOCUMENTS

| | | | |
|---|---|---|---|
| 4,633,387 | 12/1986 | Hartung et al. .......................... | 364/675 |
| 4,740,910 | 4/1988 | Sakata et al. ............................ | 395/288 |
| 5,053,950 | 10/1991 | Naganuma et al. .................... | 364/675 |
| 5,115,505 | 5/1992 | Bishop et al. .......................... | 395/674 |
| 5,202,989 | 4/1993 | Hirosawa et al. ...................... | 395/675 |
| 5,218,713 | 6/1993 | Hammer et al. .................... | 395/200.31 |

FOREIGN PATENT DOCUMENTS

WO 93/00632  1/1993  WIPO .............................. G06F 11/34

OTHER PUBLICATIONS

Yang, Cui–Qing et al., "Performance Measurement for Parallel and Distributed Programs: A Structured and Automated Approach", IEEE Transactions on Software Engineering, V. 15, N. 12, Dec. 1989, pp. 1615–1629.

Chen, J.N. et al., "Unidirectional Communication Model for Transmission of Performance Data", IBM Technical Disclosure Bulletin, V. 36, N. 06B, Jun. 1993, pp. 447–449.

Primary Examiner—James P. Trammell
Assistant Examiner—John Q. Chavis
Attorney, Agent, or Firm—W. A. Kinnaman, Jr.

[57] ABSTRACT

A reporter facility for reporting data from a sysplex with a plurality of operating system images. The reporter facility comprises one or more data sets in the operating system images containing the reportable data. A first data server is provided in a first one of the operating system images and one or more second data servers are provided in the operating system images with the data sets containing reportable data. The second data servers on receipt of a request issued by the first data server collect the reportable data from the data sets and pass it through the connections to the first data server, which then passes it to the reporter facility. In one embodiment of the invention the data sets include data relating to the use and load of resources within the sysplex.

6 Claims, 9 Drawing Sheets

| CALL ERBDSQRY | (ANSWER_AREA_ADDR<br>,ANSWER_AREA_ALET<br>,ANSWER_AREA_LENGTH<br>,REQUEST_TYPE<br>,START_TIME<br>,END_TIME<br>,SMF_RECORD_TYPE_INFO<br>,SMF_RECORD_TYPE_LIST<br>,SMF_SYSTEM_NAME_INFO<br>,SMF_SYSTEM_NAME_LIST<br>,RETURN_CODE<br>,REASON_CODE) |

| NAME | LENGTH | FORMAT | DESCRIPTION |
|---|---|---|---|
| SMFxxDAT | 4 | 0CYYDDDF | RMF ACTUAL INTERVAL START DATE |
| SMFxxIST | 4 | 0HHMMSSF | RMF ACTUAL INTERVAL START TIME |
| SMFxxINT | 4 | MMSSTTTF | RMF ACTUAL INTERVAL LENGTH |
| SMFxxOIL | 2 | INTEGER | RMF PROJECTED INTERVAL LENGTH (SEC) |
| SMFxxSYN | 2 | INTEGER | RMF SYNCHRONIZATION VALUE (SEC) |
| SMFxxLGO | 8 | (STCK) | RMF OFFSET GMT TO LOCAL TIME |
| SMFxxGIE | 8 | (STCK) | RMF PROJECTED INTERVAL END (GMT) |

FIG.6D

| CALL ERBDSREC | (ANSWER_AREA_ADDR ,ANSWER_AREA_ALET ,ANSWER_AREA_LENGTH ,RMF_RECORD_TOKEN_LIST ,RETURN_CODE ,REASON_CODE) |
|---|---|

FIG.7A

| LENGTH | RECTOK1 650 | RECTOK2 650 | ... |
|---|---|---|---|

FIG.7B

| CALL ERB3XDRS | (ANSWER_AREA_ADDR<br>,ANSWER_AREA_ALET<br>,ANSWER_AREA_LENGTH<br>,START_TIME<br>,END_TIME<br>,SYSTEM_NAME<br>,RETURN_CODE<br>,REASON_CODE) |
|---|---|

| DEL 1002 | RTN 1003 | RSN 1004 | DGV 1005 | * |
|---|---|---|---|---|
| DGS 1008 | MNT 1010 | SAM 1012 | RNG 1015 | |
| BEG | | | | * |
| END | | | DRC 1031 | |
| ... | | | | |

RESOURCE MEASUREMENT FACILITY IN A MULTIPLE OPERATING SYSTEM COMPLEX

This application is a continuation of application Ser. No. 08/359,130, filed Dec. 19, 1994 now abandoned.

BACKGROUND OF THE INVENTION

1. Field of the Invention

The invention relates to a sysplex with a plurality of operating system images connected through connections comprising a reporter facility for reporting data from the sysplex. The reporter facility has in-storage buffers and data sets in the operating system images containing the reportable data.

2. Description of the Related Art

With the ever-increasing need for computing power, a general trend is observable away from massive monolithic single-processor computers towards systems in which a large number of smaller processors are connected together and co-operate with each other in the processing of jobs. These so-called "sysplex" environments are characterised in that each of the processors within the environment runs its own operating system, i.e. each processor has its own operating system image. A central server processor provides a single synchronised timing signal across all the operating systems.

The IBM Corporation currently offers a sysplex in which a maximum of eight MVS images are connected together using the MVS Cross System Coupling Facility. This is described in the article "Use of XCF to facilitate Communication among Independent Processes", *IBM Technical Disclosure Bulletin*, vol. 3, no. 11, April 1991, pp. 357–359. In the future, it is desired to increase substantially the number of operating system images. By adding to the number of operating system images, one can ensure that the sysplex is continuously available since the impact of planned system outages or system failures is either eliminated or restricted to a small group of end users. The performance of a sysplex with a larger number of operating system images is improved and indeed allows for incremental growth—as a user needs more computing power, he or she needs to only add a further image rather than upgrading the whole of the installation.

With the increase in the number of images, a need arises to increase the systems management of the operation of the images, in particular to monitor the performance of each of the operating system images and to measure the load on the peripheral devices attached to the sysplex. By monitoring the workload of each image in the sysplex, one can ensure that the system as a whole functions in an optimal manner.

Various prior art devices for monitoring the performance of a computer system are known. The IBM Corporation offers for MVS-based systems the so-called Resource Measurement Facility (RMF) which measures and reports on the performance and availability of a customer's system. RMF issues reports about performance problems as they occur so that installation engineers can take action on the problems before they become critical. In addition, RMF can provide information about long-term system measurements to allow the user to tune the system and to provide for more capacity if needed. General Information about RMF is to be found in IBM Manual No. GC28-1028. A user's guide for RMF is available and has the number GC28-1058. Both these publications are incorporated herein by reference.

Similar programs are provided by Candle, Legent, Landmark and other companies.

In the *IBM Technical Disclosure Bulletin*, vol. 33, no. 4, September 1990, pp. 79–83, a "Computer System Performance Monitor" is described which improves the capability of a computer system to monitor its own performance. The monitor offers a defined set of performance-related function which analyze the performance of the system. This is achieved either directly by the system software or by means of an optional hardware monitoring processor via a defined interface.

Whilst these programs are fine tools for monitoring the performance of single image systems, they are unable to cope with the sore complicated requirements of monitoring multiple image systems such as a sysplex mentioned above.

Known from the prior art are a number of methods for monitoring the performance of a processor in a distributed data environment. For example, the article in the *IBM Technical Disclosure Bulletin*, vol. 34, no. 6, November 1991, pp. 387–389 entitled a "Method for Workload Performance Measurement" discloses a method which provides underlying system capabilities that enable the measurement of workloads and consists of a variety and combination of user and system work activities.

The article entitled "Large System Performance Monitor" in the IBM *Technical Disclosure Bulletin*, vol. 24, no. 3, August 1991, pp. 1416–1419 teaches a monitor to analyze the activities of the system resources in order to determine and understand their utilisation. The monitor described is able to do this without interfering with or degrading the performance of the system being monitored.

U.S. Pat. No. 5,119,493 (Janis et al) teaches a method for maintaining a selective document history log within a data processing system having multiple resource objects which are accessible by a plurality of users within the system. The history log is created and associated with each resource object for which documentation of selected activities is desired. A list of activities is created and is utilised to filter all activities which take place with respect to a particular resource object. Using this method it is possible to record only those activities which are of interest and thus memory space is efficiently used.

U.S. Pat. No. 5,109,486 (Seymour) teaches a requesting manager which sends a message to its local configuration processor requesting notices of status changed in a general or particular resource or node. The configuration manager establishes a record in its status monitoring file containing the information from the requesting processes messages. From this information, the performance of the system may be analyzed.

WO-A-93/00632 (ICL Data AB) teaches a method and system for monitoring and changing the operation of a computer system consisting of a plurality of computers connected in the form of a local area network. The system includes at least one event report generator in each executable program whose execution should be monitored, an event processing machine for processing events which are reported by an event report generator. An interface is provided for transferring an event reported by an event report generator to an event processing machine. From this machine information relating to the performance of the system may be obtained.

These prior art systems all have the disadvantage that they report events to the central monitoring program every time an event occurs at the resource or in the program which is being monitored. This leads to large amounts of message traffic throughout the network which is inefficient and, more seriously, can hinder the execution of computer jobs.

SUMMARY OF THE INVENTION

These disadvantages are solved according to the invention by a first data server in a first one of the operating system images, one or more second data servers in the operating system images with the in-storage buffers or data sets containing reportable data, whereby when the sysplex is in operation the second data servers on receipt of a request collect the reportable data from the data sets and pass it through the connections to the first data server which then passes it to the reporter facility.

This has the advantage over the prior art that the reportable data is only passed to the first one of the operating system images when it is requested. Thus the continual data traffic is avoided and data can be requested at times at which the load on the sysplex and, in particular, on the connections between the operating system images is low. The reduction in data traffic allows a much more efficient use of the connections between the operating system images.

The reporter facility can have two types of data sets in each operating system image and the requests to collect the reportable data indicate in which one of the data sets the reportable data is present.

In a further embodiment of the invention, the reporter facility includes an answer area created by the first data server into which the reportable data is stored. This allows the efficient recovery of the reportable data when it is to be processed. Storing the data on an external medium, for example, would slow down the processing of the data by a reporter processor.

The reporter facility finds particular application in a monitoring facility for monitoring the resources in a sysplex in which the data sets include data relating to the use and load of resources within the sysplex.

By monitoring the resources of the sysplex, one is able to determine the use of and the load on the resources and, as a result, adjust the work being done by each of the resources. This is particularly important in the sysplex with multiple operating system images since the processing of a program may be held up whilst it is being executed in one of the operating system images whilst other images are standing idle.

The invention also comprises a method for reporting data in a sysplex with a plurality of operating system images comprising the following steps: a first step of sending from a first one of the operating system images a request for the reportable data to other ones of the operating system images, a second step of collecting the reportable data in the other ones of the operating system images, a third step of returning the reportable data to the first one of the operating system images, a fourth step of storing the reportable data in an answer area created in the first one of the operating system images.

In a further embodiment of the invention, the method has the following steps: a first step of sending from a first one of the operating system images a request with search criteria for establishing in which ones of the operating system images the reportable data is present, a second step of matching the search criteria with the reportable data in the operating system images, a third step of returning an image list of operating system images in which the reportable data is present to the first one of the operating system images, a fourth step of using the image list for sending to the operating system images a request for collecting the reportable data in the operating system images, a fifth step of returning the reportable data to the first one of the operating system images, a sixth step of storing the reportable data in an answer area created in the first one of the operating system images.

The use of the reporter facility is not confined to an application within a resource monitoring facility. It can also find application in any sysplex in which data has to be collected and collated by one of the operating system images from the other ones of the operating system images.

DETAILED DESCRIPTION OF THE INVENTION

Figure 1:
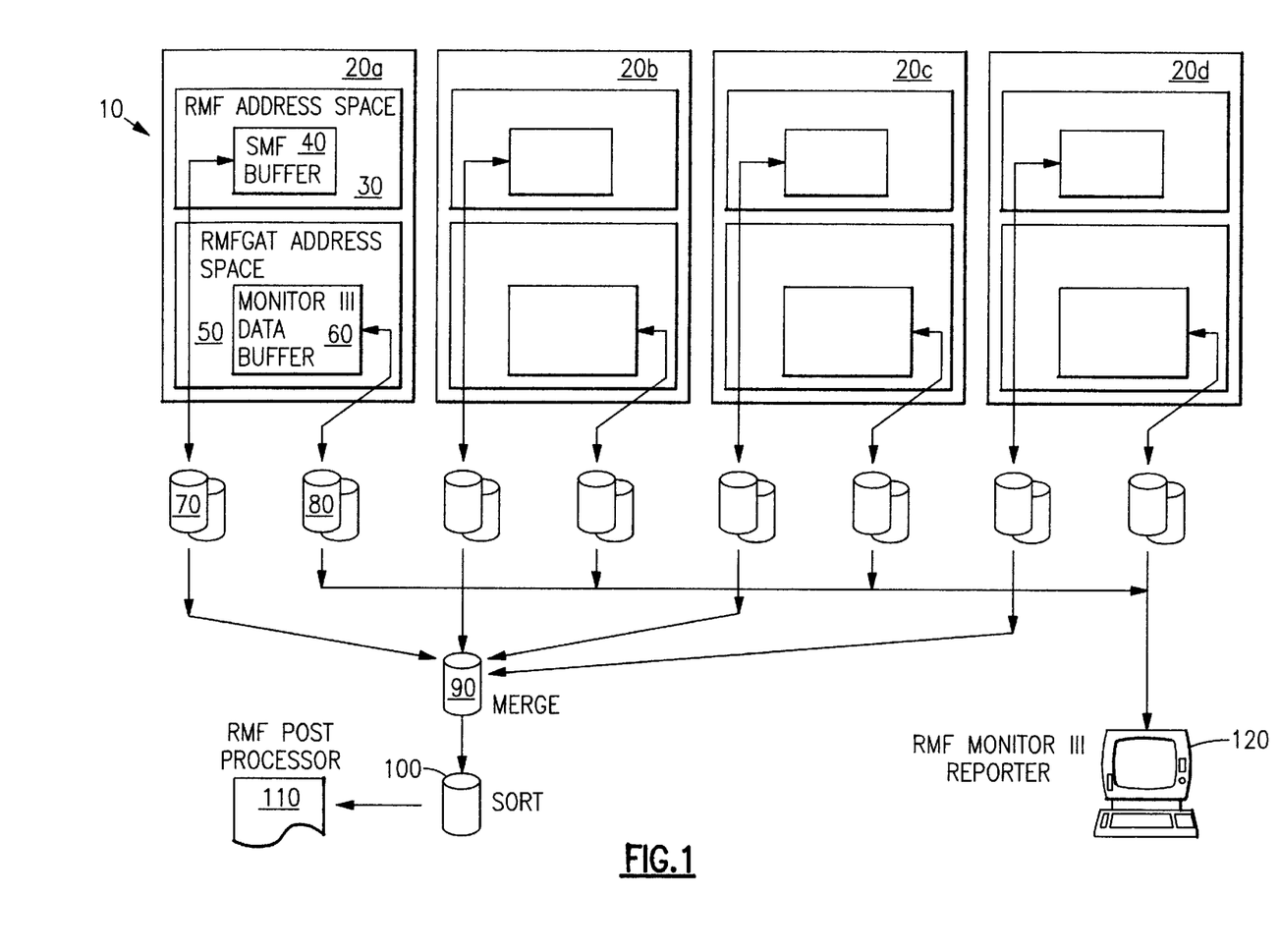
FIG. 1 shows an overview of the sysplex without the RMF Sysplex Data Server.

FIG. 1 shows an overview of a sysplex 10 containing a measurement facility. The sysplex 10 has a plurality of operating system images 20a, 20b, 20c, 20d. In FIG. 1 only four operating system images are shown for clarity. More images may be added and, in the preferred embodiment, thirty-two images are present. Reference signs on the FIG. 1 are also provided only for one of the images 20a. This is also for clarity, the corresponding elements in the other images 20b, 20c and 20d perform the same functions as those in the image 20a.

Each of the images 20 has an address space in which are placed application programs (not shown) or parts of application programs and a first measurement facility address space 30, termed the RMF address space, and a second measurement facility address space 50, termed the RMF-GAT address space. The preferred embodiment of the invention has two measurement facility address spaces 30, 50. It would be possible to incorporate the functions present in both the first measurement facility address space 30 and the second measurement facility address space 50 into a single measurement facility address space.

Within the first measurement facility address space 30, a first plurality of in-storage buffers 40, termed SMF data, is provided. The functioning of these in-storage buffers 40 will be explained in more detail below.

In the second measurement facility address space 50, a second plurality of in-storage buffers 60, termed Monitor III data, is provided. The second plurality of in-storage buffers 60 stores the so-called Monitor III records which allow the continuous monitoring of system data and allow the solution of temporary performance problems. The role of the second plurality of in-storage buffers 60 will be explained in more detail below.

The first plurality of in-storage buffers 40 and the second plurality of in-storage buffers 60 can be stored in memory from whence they may be passed to the measurement facility address spaces in other images as will be explained later. A first data set 70 is connected to the first measurement facility address space 30 and a second data set 80 is connected to the second measurement facility address space 50. The SMF data is passed to both the first in-storage buffer 40 and the first data set 70 at the same time if both are present. Similarly the Monitor III data is passed to both the second in-storage buffer 60 and the second data set 80 at the same time if both are present. The data sets 70, 80 and in-storage buffers 40, 60 are collectively referred to as data groups.

The sysplex 10 incorporates two analysis programs for evaluating the data stored in either of the first in-storage buffer 40 or the second in-storage buffer 60. A measurement facility processor 110 (the RMF Post Processor) collects the data from the direct access storage devices 70, merges it onto a single storage device 90 and sorts it as required. The sorted data is also stored on a storage device 100. Although the storage devices 90 and 100 are shown as two single storage devices in FIG. 1, in practice they are two different areas of the same storage device. The measurement facility processor 110 uses the merged and sorted data to display information about the performance of the sysplex 10.

The measurement facility reporter 120 (the RMF Monitor III reporter) collects the data from the direct access storage devices 80 and allows a real time analysis of the performance of the sysplex 10.

Figure 2A:
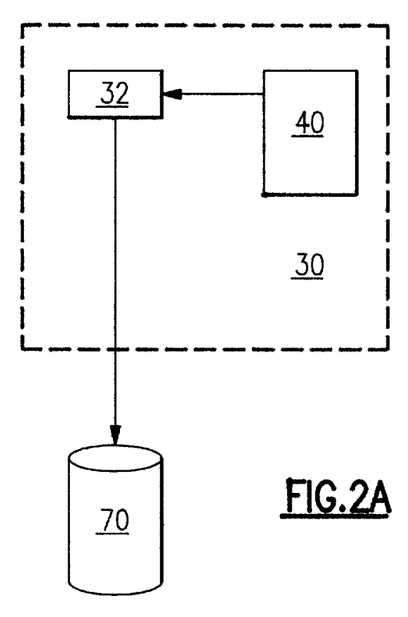
FIG. 2A shows an overview of the first measurement facility address space (RMF Address Space).

FIG. 2A shows an overview of the first measurement facility address space 30 with the first plurality of in-storage buffers 40.

The first plurality of in-storage buffers 40 stores the so-called system management facilities (SMF) records which allow an analysis of the long term system workload and resource utilisation. The SMF data gathering routines 32 obtain information about the system and pass this information to the first in-storage buffers 40 and the first data set 70.

It is the responsibility of the owner of the sysplex 10 to decide what information is to be stored and what records are to be gathered. Factors to be taken into account when making this decision are:

What records must the SMF data gathering routines 32 produce to give the sysplex owner the information required?

Are programs running which produce large amounts of SMF records, for example data base programs?

What is the impact of the system configuration on the operation of the sysplex 10?

How much contention on each of the operating system images 20 is there for the resources that the SMF data gathering routines 32 require?

Figure 3A:
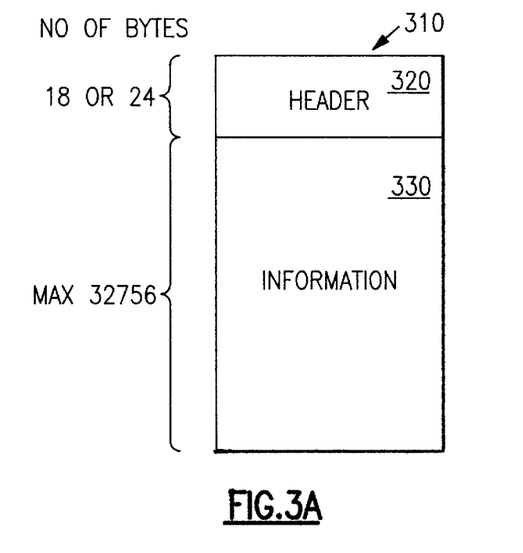
FIG. 3A shows an example of the format of SMF data records.

FIG. 3a shows an example of the format of SMF data records 310 as the stored in the first plurality of data buffers 40. The SMF data record 310 consists of an SMF record header 320 which is in this case eighteen or twenty-four bytes long and information 330 which can be up to 32756 bytes in length. The exact length of the SMF record 310 is indicated in the SMF record header 320 as will be described later. The structure of the information 330 is variable and is specified by the user of the SMF records 310.

Figure 3B:
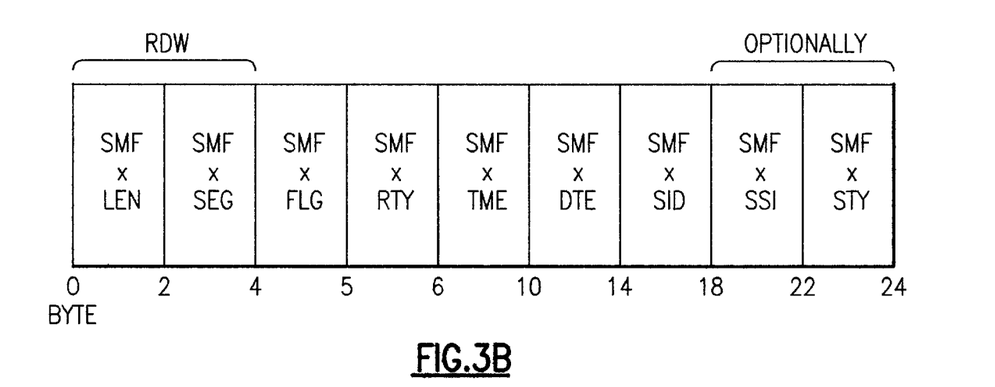
FIG. 3B shows an example of the structure of the header for SMF data records.

The fixed structure of the SMF record header 320 is shown in FIG. 3B. The first field in the SMF record header 320 is called SMFxLEN and is two bytes in length. It indicates the total length of the SMF record 310 including the SMF record header 320 and the information parts 330 of the SMF record 310. The next field is called SMFxSEG and is used if the SMF data spans more than one SMF record 310, i.e. if the data that is to be recorded is more than 32,756 bytes in length. If the SMF data does not span more than one SMF record 310, then the two bytes in the SMFxSEG field are both set to hexadecimal zero. The SMFxLEN and the SMFxSEG fields together form a four byte record descriptor called the record descriptor word (RDW).

The next field in the SMF record 310 is the SMFxFLG which indicates the operating system in which the SMF records were generated. It is one byte in length. For example, if the byte is set to 3, it indicates an MVS/SP Version 4 operating system. If set to 4, it indicates that the operating system is MVS/ESA and if set to 5 that the operating system is MVS/XA. The values 0, 1 and 2 are reserved for other purposes.

The SMFxRTY field is one byte in length and can take the values 0 to FF (hexadecimal). It indicates the type of SMF record 310 being generated. In the preferred embodiment of the invention, the record types 0 to 127 (decimal) are reserved for use by the IBM operating system images. In particular, record types 70–79 are used by the resource measurement facility as described herein. The record types 128–255 are free for use by applications programs.

The SMFxTME field is four bytes in length and indicates the time elapsed since midnight in hundredths of a second since the SMF record 310 was created. The SMFxDTE field is also four bytes in length and indicates the date on which the SMF record 310 was created.

Finally, the SMFxSID field indicates the identification number of the system or of the operating system image 20 on which the SMF record 310 was created.

In another version of the SMF record 310, further fields are provided to record the subsystem identification (SMFxSSI—four bytes in length) of the subsystem on which the SMF record was created and also the subtype of the record (SMFxSTY). This gives a SMF record header 320 which is 24 bytes in length.

It will be observed that the names of the field all have a small x in the fourth position. The value of x indicates the type of SMF record. X can take a value from 0 to 255. In the preferred embodiment of the invention, x has a value between 70 and 79.

As mentioned above, SMF data gathering routines 32 are supplied on each image 20. These SMF data gathering routines 32 pass the information which the owner of the system has specified in the form of records to a data buffer 40 and thence fill each of the data sets in the buffer 40 one at a time. When one of these data sets becomes full, the SMF data gathering routines 32 search for an empty data set within the first measurement facility address space 30. Whilst one data set is being filled with SMF records, SMF dump routines are used to write the data out of the full ones of the first plurality of data sets onto the storage space reserved on the direct access storage device 70.

Figure 2B:
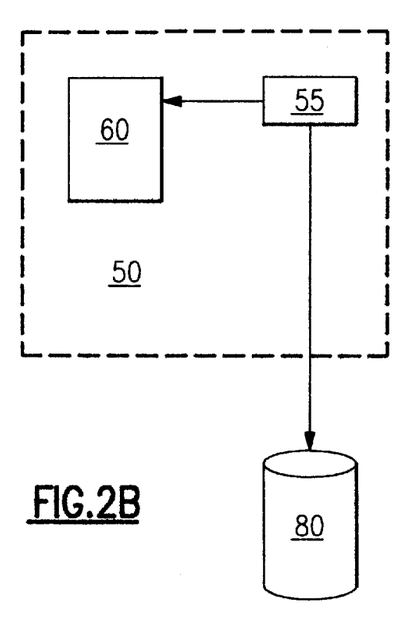
FIG. 2B shows an overview of the second measurement facility address space (RMFGAT Address Space).

The structure of the second measurement facility address space 50 is shown in FIG. 2B. It includes not only the second plurality of in-storage buffers 60 mentioned above but also a data gatherer 55 which collects the system data, formats it into samples and stores the data in the in-storage buffers 60 or data sets 80.

The data gatherer 55 is started by a command which has the following options:

CYCLE(nnnn)

This specifies the length of time in milliseconds for which the system data is cycled.

DATASET (suboptions)

This controls the recording to the VSAM data sets. The suboptions control the saving of the data from the MINTIME (nnn)

This specifies the length of a time interval in seconds. At the end of this time interval, the data gatherer 55 combines all samples gathered into a set of samples which can then be summarised and reported by the measurement facility reporter 120. The exact structure of the set of samples depends on the type of data collected.

Figure 4:
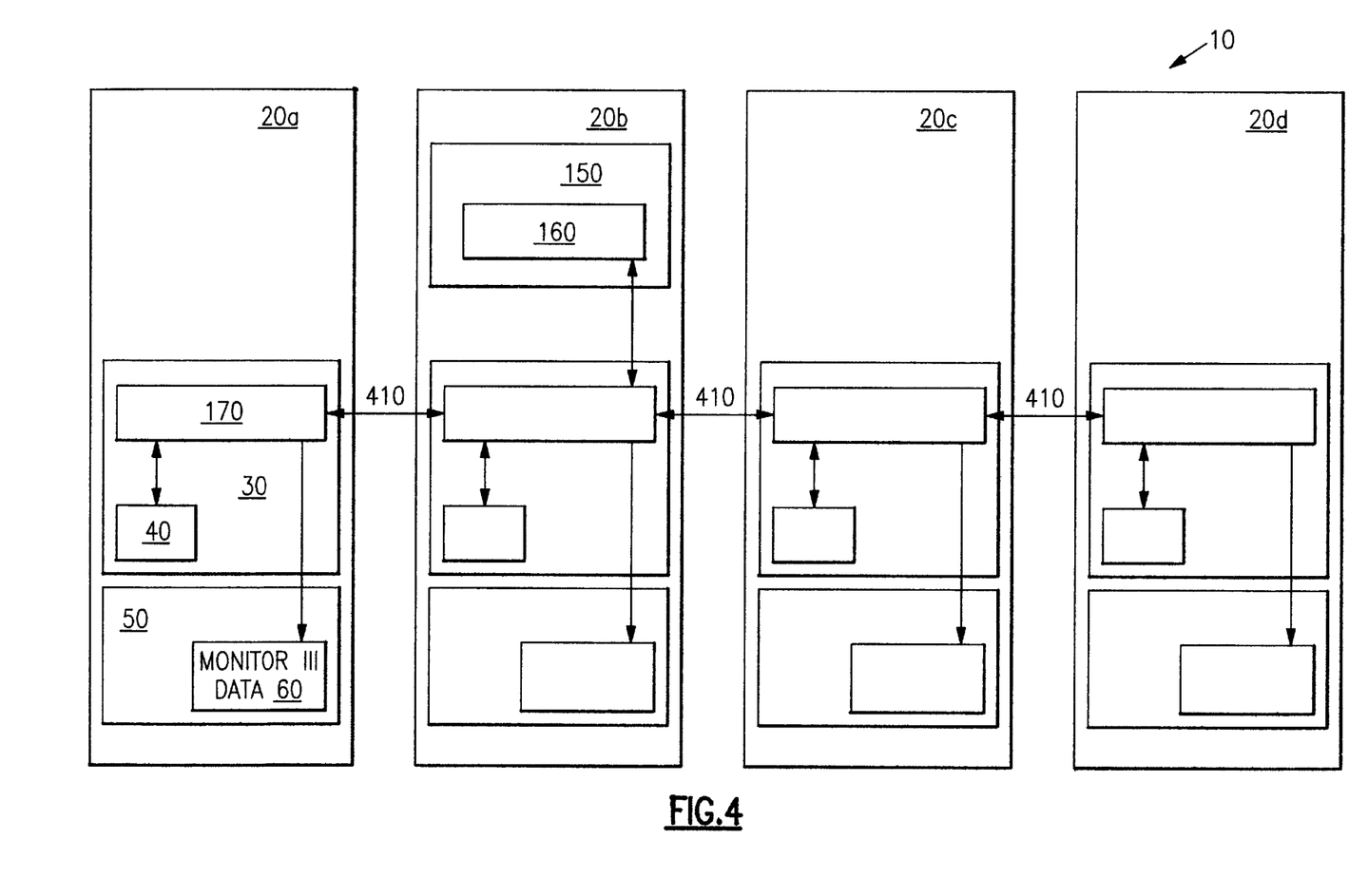
FIG. 4 shows an overview of the sysplex with the sysplex data server of the current invention.

FIG. 4 shows an overview of the sysplex 10 with a sysplex data server 170. For ease of identification, the reference signs used in FIG. 4 refer to the same elements of the sysplex 10 as those used in FIG. 1. Within the first measurement facility address space 30 in addition to the modules shown in FIG. 1, a sysplex data server 170 is provided.

The sysplex data server 170 has access as is shown on FIG. 4 to the SMF record data stored in the buffers 40 shown in FIG. 2A and also to the buffers 60 provided in the second measurement facility address space 50 as shown in FIG. 2B. The sysplex data server 170 is identical in each of the operating system images 20a–d and is joined through connections 410 shown on FIG. 4 to all of the other sysplex data servers 170 in the other operating system images 20a–d. The sysplex data server 170 is always active in the first measurement facility address space 30 when the resource measurement facility is running in the operating system image 20.

The sysplex data server 170 is able to process all types of data which is used by the resource measurement facility, in particular it is able to use the SMF data and the Monitor III data. It supplies a series of General Use Programming Interface (GUPI) services which may be invoked either by the RMF reporter sessions themselves, e.g. the measurement facility reporter 120, or by authorised applications programs.

FIG. 4 also shows a user address space 150 in the operating system image 20b which is connected to the sysplex data server 170 in the first measurement facility address space of the operating system image. The user address space 150 incorporates an applications program 160 which is authorised to use the GUPI services provided by the sysplex data server 170. Applications program 160 constitutes a reporter facility for reporting data from the sysplex 10.

The sysplex data server 170 provides the following GUPIs: ERBDSQRY—RMF Query Available Sysplex SMF data service, ERBDSREC—RMF Request Sysplex SMF Record Data Service and ERB3XDRS—RMF Monitor III Sysplex Data Retrieval Service.

Figure 5A:
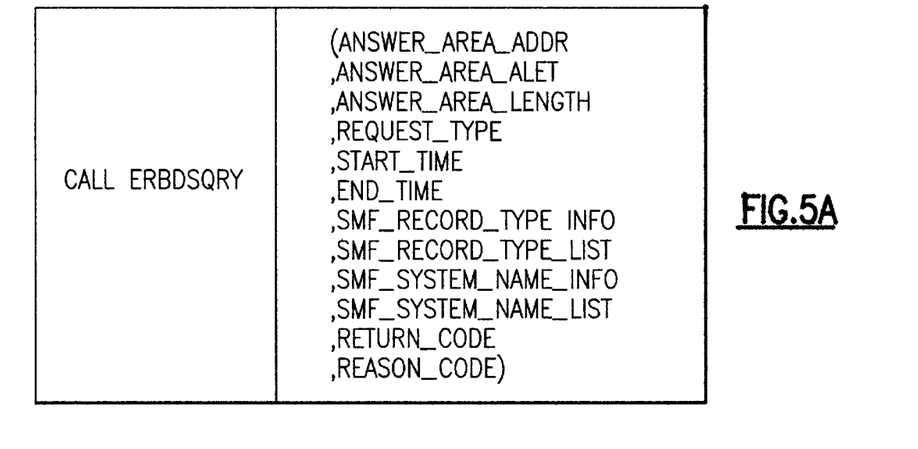
FIG. 5A shows the format of the CALL ERBDSQRY GUPI.

The ERBDSQRY GUPI is used to request a directory of SMF record data available in the data sets 40 or sets of samples in the data sets 60 on each operating system image 20 in the sysplex 10. The CALL statement for ERBDSQRY is written as shown in FIG. 5A.

The parameters supplied to the ERBDSQRY have the following values:

ANSWER_AREA_ADDR

Specifies the address in the memory where the sysplex data server 170 returns the requested information. The area can be either in the user address space 150 or in a public address and data space. The parameter answer_area_addr is defined as a pointer variable of length 4.

ANSWER_AREA_ALET

Specifies the access list entry table (ALET) of the answer area specified by the answer_area_addr parameter. If the answer area resides in the user address space 150, the value of the answer_area_alet must be 0. The parameter answer_area_alet is defined as an unsigned integer variable of length 4.

ANSWER_AREA_LENGTH

Specifies the length of the answer area whose address is given in the answer_area_addr parameter. If not enough space is provided the sysplex data server 170 informs the calling applications program 160 about how much space should have been provided, as memory space addressed by the answer_area_addr parameter must contain the length needed for the complete data. The answer_area_length is defined as an unsigned integer variable of length 4.

REQUEST_TYPE

Specifies the ERBDSQRY function code and may take one of the following values:

| | |
|---|---|
| SMF | Request information about SMF records 310 of any type and subtype. Information will be returned about all SMF records 310 where the SMF time information (the point in time specified in the date and time fields from the SMF record header 320) is contained in the time interval specified in the start_time and end_time parameters (see below). |
| RMF | Request information about SMF records 310 of any RMF type and subtype. Information will be returned about all SMF records 310 where the projected RMF measurement interval end time (specified in the RMF product section) is contained in the time interval specified in the start_time and end_time parameters (see below). |

The request_type parameter is defined as a character variable of length 3.

START_TIME

Specifies the date and time of the beginning of the time interval for which information is requested. The start_time parameter is defined as a character variable of length 14 and is presented in the so-called "sorted" format:

yyyy,mm,dd,hh,mn,ss, where yyyy is the year, mm is the month, dd is the day, hh is the hour, mn is the minute and ss the second value of the start time.

If it is desired to omit this information, a value of 14 blanks may be passed and the parameter will then default to the value of the "oldest" SMF time found in any of the data sets 40 at the time the ERBDSQRY GUPI is called.

END_TIME

Specifies the date and time of the end of the time interval for which information is requested. The parameter end_time is defined as character variable of length 14 in the same "sorted" format as the start_time parameter. Similarly, the information may be omitted by passing a value of 14 blanks. The parameter's value will then default to the "newest" SMF time found in any of the data sets 40 at the time the ERBDSQRY GUPI service is called.

SMF_RECORD_TYPE_INFO

Specifies the type of the list of SMF record types provided on the smf_record_type_list parameter. It may have one of the following values:

| | |
|---|---|
| INCLUDE | The list of SMF record types provided on the smf_record_type_list parameter is an inclusion list, i.e. information is requested for the listed SMF record types. |
| EXCLUDE | The list of SMF record types provided on the smf_record_type_list parameter is an exclusion list, e.g. information is requested for all but the listed SMF record types. |
| ALL | The list of SMF record types provided on the smf_record_type_list parameter is ignored, e.g. information is requested for all SMF record types. |

The smf_record_type_info parameter is defined as a character variable of length 7.

SMF_RECORD_TYPE_LIST

Figure 5B:
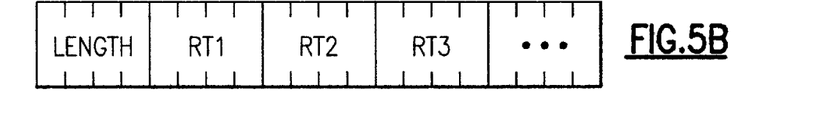
FIG. 5B shows the format of the smf_record_type_list parameter.

Specifies the list of SMF record types for which information is requested. As shown in FIG. 5B it is defined as an unsigned integer variable of length 4 that specifies the number of elements in an array, followed by an array of pairs of unsigned integers of length 2, in which the first number of each pair specifies the record type and the second number of each pair specifies the record subtype. For record types without subtypes, a subtype of 0 is specified.

SMF_SYSTEM_NAME_INFO

Specifies the type of the list of operating system images 20 on which SMF data sets 40 are found which are provided on the smf_system_name_list parameter. The parameter can take one of the following values:

| | |
|---|---|
| INCLUDE | The list of images 20 provided on the smf_system_name_list parameter is an inclusion list, i.e. information is requested for systems with the listed operating system images 20. |
| EXCLUDE | The list of SMF system names provided on the smf_system_name_list parameter is an exclusion list, e.g. information is requested for all systems in the sysplex excluding the operating system images 20 with the listed names. |
| ALL | The list of operating system image names provided on the smf_system_name_list parameter is ignored, e.g. information is requested for all systems in the sysplex 10. |

The smf_system_name_info parameter is defined as a character variable of length 7.

SMF_SYSTEM_NAME_LIST

Figure 5C:
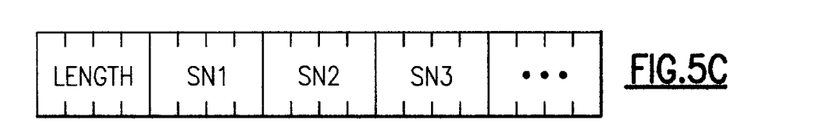
FIG. 5C shows the format of the smf_system_name_list parameter.

Specifies the list of operating system image 20 names for which information is requested. The smf_system_name_list is defined as an unsigned integer variable of length 4 that specifies the number of array elements, followed by an array of character of length 4. Each array element has an image name.

RETURN_CODE

When ERBDSQRY GUPI is completed, the return_code parameter contains the return code for the GUPI. It is defined as an unsigned integer variable of length 4.

REASON_CODE

When the ERBDSQRY GUPI is completed, the reason_code contains the reason code why the operation was not carried out successfully. It is defined as an unsigned integer variable of length 4.

Figure 6A:
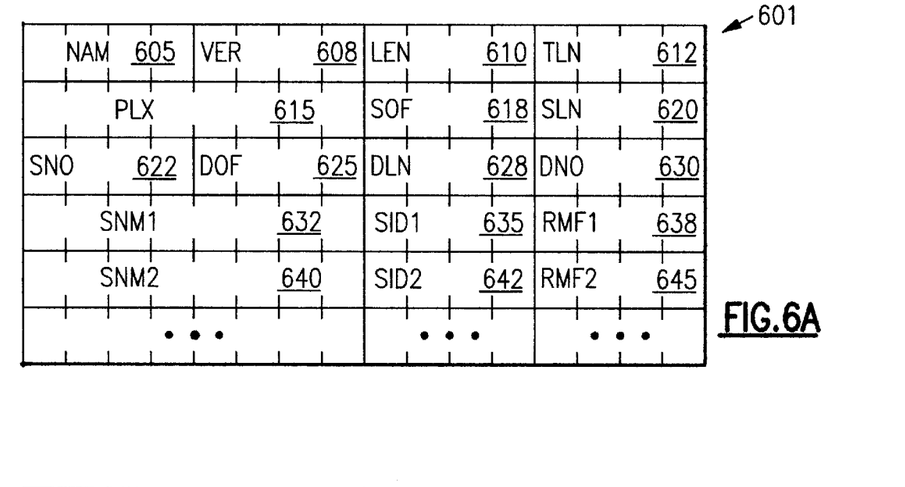
FIG. 6A shows the format of the common header returned from the GUPIs.
Figure 6B:
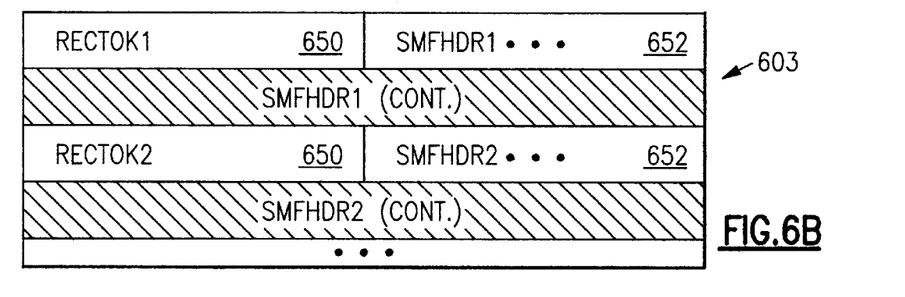
FIG. 6B shows the answer area created by the ERBDSQRY GUPI when the request_type parameter has the value SMF.
Figure 6C:
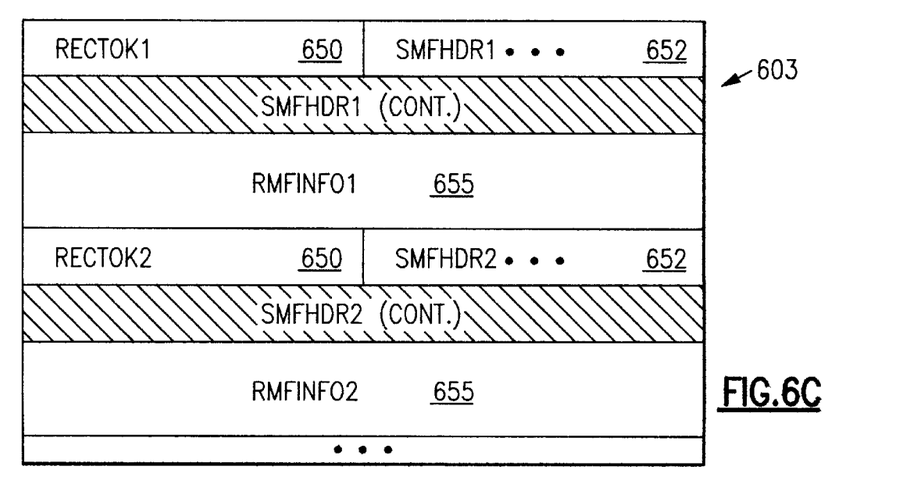
FIG. 6C shows the answer area created by the ERBDSQRY GUPI when the request_type parameter has the value RMF.

When ERBDSQRY returns control to the applications program 160 and the service was completed successfully, an answer area 600 is created at the address in memory specified by the answer_area_addr parameter. The structure of this answer area 600 is divided into a header area 601 and a data area 603. The header area 601 is common to all three GUPIs and is shown in FIG. 6A. The data area is different depending on the type of GUPI called and, in the case of the ERBDSQRY GUPI, the value of the request type parameter. FIG. 6B shows the data area 603 for the answer area when the request_type parameter has the value SMF. FIG. 6C shows the data area 603 for the answer area 600 when the request_type parameter has the value RMF. The data areas 603 contain a system list entry for the data gathered from each operating system image 20.

The blocks in FIG. 6A have the following values:

NAM 605 Four character acronym of the common header 601 as follows:

| | |
|---|---|
| | 'DSQA' for the ERBDSQRY GUPI common header |
| | 'DSRA' for the ERBDSREC GUPI common header |
| | 'XDRH' for the ERB3XDRS GUPI common header |
| VER 608 | Version of the common header 601 (initially set to 1). |
| LEN 610 | Total length of the returned data. |
| TLN 612 | Total length of the answer area 600 needed to contain all the requested data. |
| PLX 615 | Name of the operating system image 20 on which the calling applications program 160 using the GUPI is running. |
| SOF 618 | Offset from the header to the first system list entry SNM. |
| SLN 620 | Length of one system list entry (i.e. length of SNM, SID, RMF fields). |
| SNO 622 | Number of system list entries (SNM, SID, RMF). |
| DOF 625 | Offset from the header 601 to the first data section. For the detailed layout, refer to the individual data section explanations below. |
| DLN 628 | Length of one data section. For a variable length data section, this field is zero. In this case, the length is stored in an individual data section header. |
| DNO 630 | Number of returned data sections. |
| system list | contains one entry per operating system image 20 in the sysplex 10: |
| SNMn | 8-character system name for the operating system image 20. |
| SIDn | 4-character SMF system ID. If RMF is not active on this system, this field contains hex zeros. |
| RMFn | 32-bit RMF status indicator, in which: Bit 1 indicates the status of the RMF address space 30 on this system ('1'B = active) Bit 2 indicates the status of the RMF Data Buffer 40 for SMF data on this system ('1'B = active) Bit 3 indicates the status of the RMF Monitor III address space 50 on this system ('1'B = active) Bits 4 to 32 are reserved |

The data section 603 returned when the ERBDSQRY GUPI is completed has a layout shown in FIG. 6B when the request_type parameter's value is SMF. The blocks in FIG. 6B contain the following information:

RECTOKn 650

Record token provided by the ERBDSQRY GUPI which is used by subsequent calls to the ERBDSREC GUPI.

SMFHDRn 320, 652

SMF record header (24 bytes) as described in FIG. 3B.

In FIG. 6C the data section 603 of the answer area 600 when the request_type parameter has the value RMF. The fields RECTOKn 650 and SMFHDRn 320, 652 contain the same information as in FIG. 6B.

The RMFINFO field 655 contains 32 bytes of additional information from the RMF product section of the SMF record 310.

Figure 6D:
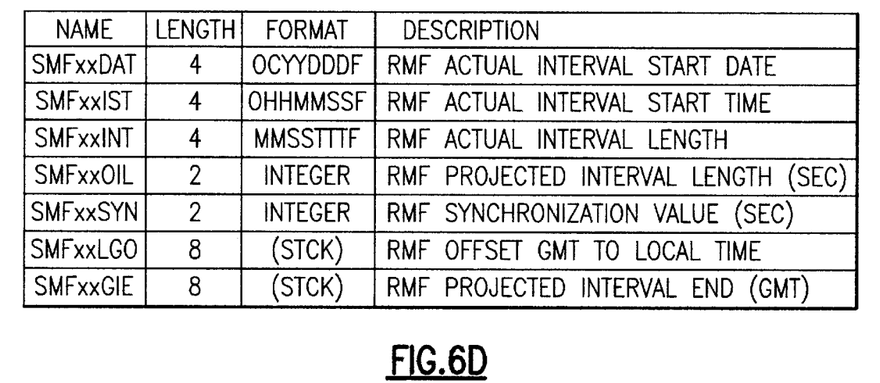
FIG. 6D shows the format of the RMF product section of the SMF record.

FIG. 6D shows the additional information which is contained in the RMF product section of the SMF record 310. It contains the following fields:

SMFxxDAT which has a length of 4 bytes and give actual start time of the RMF interval.

SMFxxIST which has a length of 4 bytes and gives the actual start time of the RMF interval.

SMFxxINT which has a length of 4 bytes and gives the actual length of the RMF interval.

SMFxxOIL which has a length of 2 bytes and gives the projected interval length in seconds.

SMFxxSYN which has a length of 2 bytes and gives the RMF synchronization value in seconds.

SMFxxLGO which has a length of 8 bytes and gives the offset time between Greenwich Mean Time (GMT) and local time.

SMFxxGIE which has a length of 8 bytes and gives the projected end in GMT of the RMF interval end.

Figure 7A:
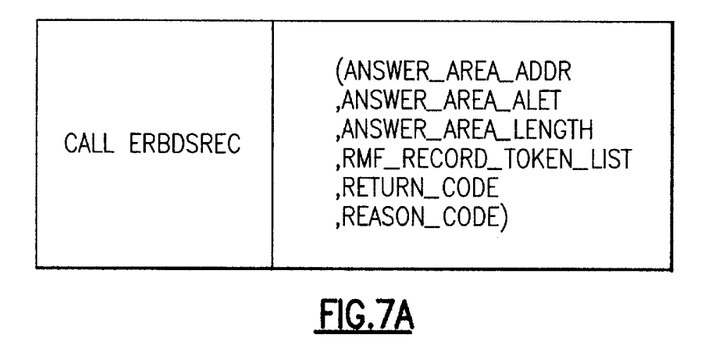
FIG. 7A shows the format of the CALL ERBDSREC GUPI.

The ERBDSREC GUPI is used to request SMF record data from the data sets 40 on each operating system image 20 in the sysplex 10. For each requested SMF record, the record token 650 included in the answer area 600, obtained from an earlier call of the ERBDSQRY GUPI, is included on the list of record tokens 650 passed as parameters to the ERBDSREC GUPI.

The call for ERBDSREC GUPI is shown in FIG. 7.

ANSWER_AREA_ADDR

Specifies the address of an answer area 800 where the calling routines RMF returns the requested information. The area can be in the user address space 150 or in a public address and data space. The parameter is defined as a pointer variable of length 4.

ANSWER_AREA_ALET

Specifies the access list entry table (ALET) of the answer area specified by the answer_area_addr parameter. If the area resides in the user address space 150, the value of the answer_area_alet must be 0. The parameter answer_area_alet is defined as an unsigned integer variable of length 4.

ANSWER_AREA_LENGTH

Specifies the length of the answer area 800 whose address is given in the answer_area_addr parameter. If not enough space is provided, the sysplex data server 170 informs the calling program about how much space should have been provided as memory space addressed by the answer_area_addr parameter must contain the length needed for the complete data. The answer_area_length is defined as an unsigned integer variable of length 4.

RMF_RECORD_TOKEN_LIST

Figure 7B:
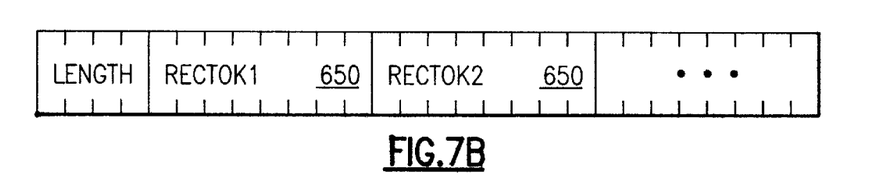
FIG. 7B shows the format of the rmf_record_token_list parameter.

Specifies the list of record tokens 650 for the SMF records that are requested using the ERBDSQRY GUPI. As shown in FIG. 7B it is defined unsigned integer variable of length 4 that specifies the number of array elements followed by an array of characters, each element of which has length 8.

RETURN_CODE

When ERBDSQRY GUPI is completed, the return_code parameter contains the return code for the GUPI. It is defined as an unsigned integer variable of length 4.

REASON_CODE

When the ERBDSQRY GUPI is completed, the reason_code contains the reason code why the operation was not carried out successfully. It is defined as an unsigned integer variable of length 4.

Figure 8:
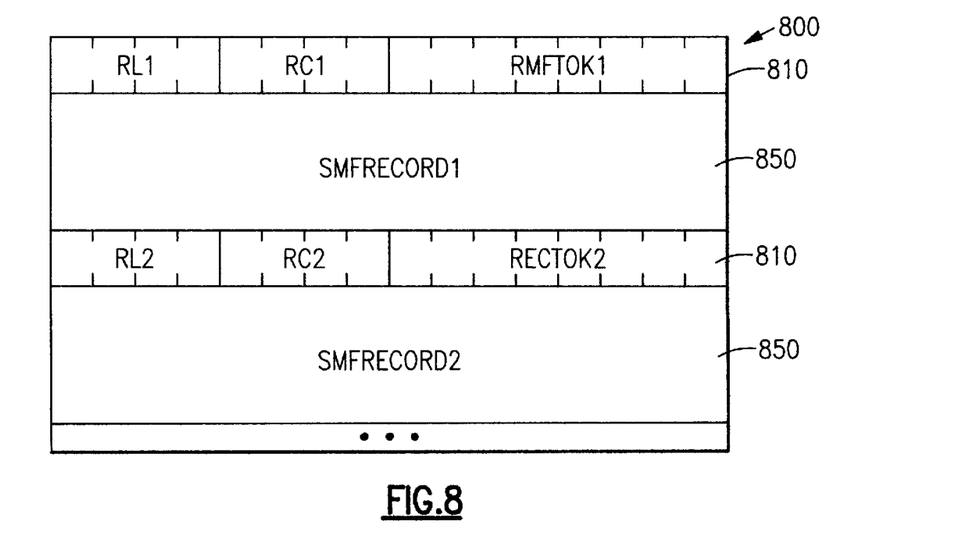
FIG. 8 shows the data section header answer area created on return from the ERBDSREC GUPI.

When ERBDSREC returns control to the applications program 160 and the service was completed successfully, an answer area is created at the address in memory specified by the answer_area_addr parameter. The answer area consists of the common header 601 described in FIG. 6A and a data section 800. The structure of the data section 800 is shown in FIG. 8. The answer area 800 contains a data section header 810 plus a data section entry 850 for each requested SMF record. The entries 850 appear in the order of the request, i.e. the order of tokens specified in the rmf_record_token_list parameter. The data entries 850 for each SMF record 310 contain a data section header 810 provided by the ERBDSREC GUPI and the SMF record (SMFRECORDn) 850 itself. The various fields in the data section 800 have the following values:

| | |
|---|---|
| RLn | Length of this SMF record 310 data entry (including the data header 810) |
| RCn | Return code for the request of this SMF record: |
| | 0  Data returned. SMF record data 850 follows the data header 810. |
| | 4  Data not returned. Timeout occurred before the SMF record was received from remote operating system image 20. |
| | 8  Data not returned. Record token RMFTOKn does not correspond to an existing SMF record on an operating system image 20 in the sysplex 10. |
| RECTOKn | |

Record token for this SMF record 850. This token is copied from input parameter rmf_record_token_list.

SMFRECORDn

This is the SMF record 850.

Figure 9:
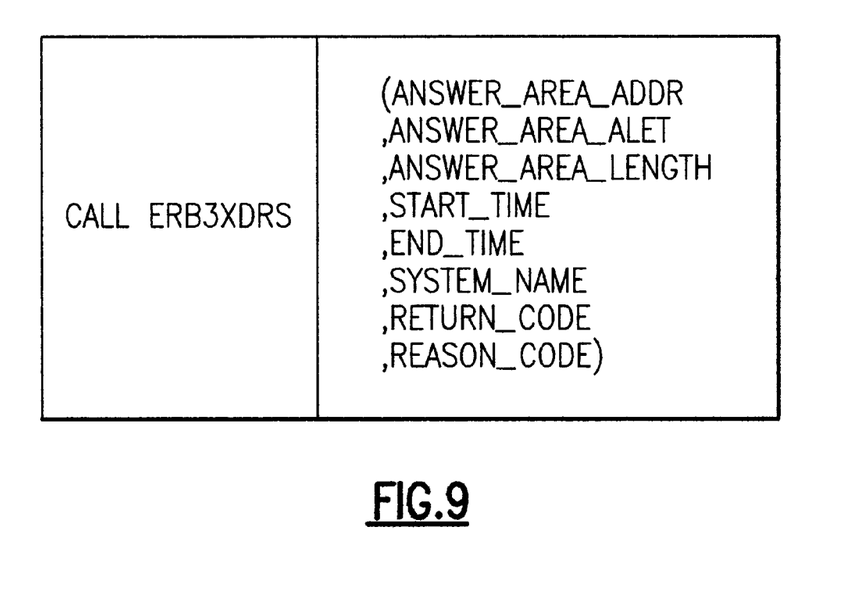
FIG. 9 shows the format of the CALL ERB3XDRS GUPI.

The ERB3XDRS GUPI is used to request a set-of-samples of Monitor III data according to a specified date and time range.

The call to ERB3XDRS GUPI is written as shown in FIG. 9.

The parameters supplied to the ERB3XDRS have the following values:

ANSWER_AREA_ADDR

Specifies the address of an answer area in the memory where the sysplex data server 170 returns the requested information.

The area can be either in the user address space 150 or in a public address and data space. The parameter answer_area_addr is defined as a pointer variable of length 4.

ANSWER_AREA_ALET

Specifies the access list entry table (ALET) of the answer area specified by the answer_area_addr parameter. If the area resides in the user address space 150, the value of the answer_area_alet must be 0. The parameter answer_area_alet is defined as an unsigned integer variable of length 4.

ANSWER_AREA_LENGTH

Specifies the length of the answer area whose address is given in the answer_area_addr parameter. If not space is provided the sysplex data server 170 informs the calling program about how much space should have been provided as memory space addressed by the answer_area_addr parameter must contain the length needed for the complete data. The answer_area_length is defined as an unsigned integer variable of length 4.

START_TIME

This parameter specifies the date and time of the beginning of the time range information which is requested. The start_time parameter is defined as a character variable of length 14 in the "sorted" format as explained above.

END_TIME

This parameter specifies the date and time of the end of the time for which range information is requested. As with the start_time parameter, the end_time parameter is defined as character variable of length 14 in the same "sorted" format.

SYSTEM_NAME
Specifies the name of the image 20 for which information is requested. This is the four character SMF system identification (SID). Should the request_type parameter have the value 'SCP', the system name may be specified as four blanks (null value) and, as a result, information is collected from all operating system images 20 in the sysplex 10. The system_name parameter is defined as a character variable of length 4.

RETURN_CODE
When the ERB3XDRS GUPI call is completed, the return_code parameter contains a return code which is defined as an unsigned integer variable of length 4.

REASON_CODE
When the ERB3XDRS GUPI call is completed, the reason_code parameter contains a reason code which is defined as an unsigned integer variable of length 4.

Figure 10:
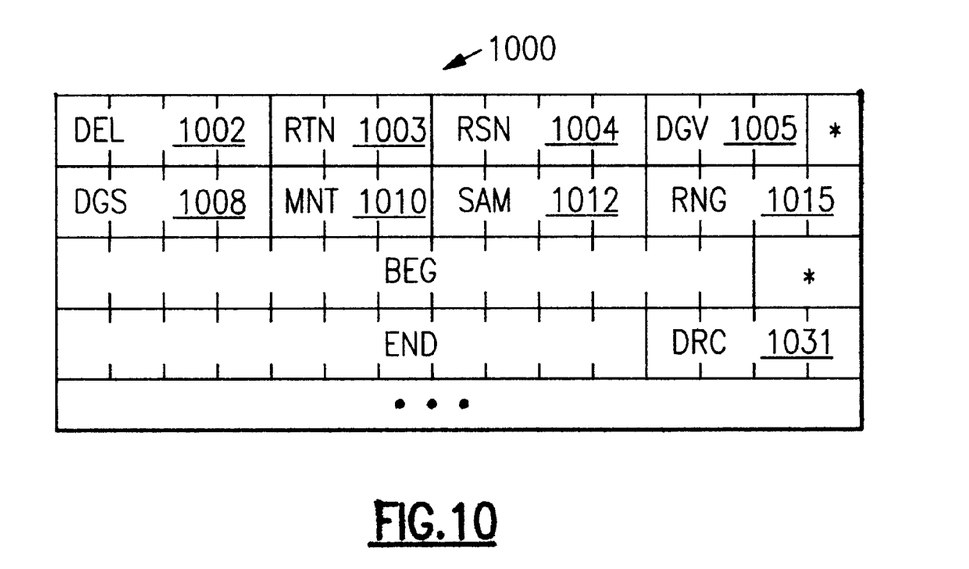
FIG. 10 shows the format of the data section header of the answer area created on return from the ERB3XDRS GUPI.

ERB3XDRS Answer Area Layout: When the ERB3XDRS GUPI call returns control to the calling program and the service was completed successfully, the answer area at the address specified by the ANSWER_AREA_ADDR parameter contains the common header 601 as shown in FIG. 6A plus the requested Monitor III data section whose structure is shown in FIG. 10.

The Monitor III data section comprises a data section header 1000 followed by the Monitor III actual data. The data section consists of one or more set-of-samples. The layout of the uncompressed set-of-samples is described in the incorporated by reference *RMF User's Guide* (IBM Manual No. GC28-1058). The fields in the data section header 1000 contain the following information:

| | |
|---|---|
| DEL 1002 | Length of this data section |
| RTN 1003 | Data retrieval return code |
| RSN 1004 | Data retrieval RSN |
| DGV 1005 | Data gatherer version in the format 'VRM' |
| DSG 1008 | System name of the operating system image 20 where the data gatherer is running |
| MNT 1010 | Data gatherer MINTIME option |
| SAM 1012 | Actual number of samples for the returned data |
| RNG 1015 | Actual range length (in seconds) |
| BEG | Actual range start time (in the sorted time format YYYYMMDDHHMMSS) |
| END | Actual range end time (in the sorted time format YYYYMMDDHHMMSS) |
| DRC 1031 | Data reduction exit completion code |

Fields labelled with a "*" are reserved.

A typical embodiment of the invention for the use of the GUPIs will now be described with the help of FIG. 11. The following scenario will be assumed for the purposes of explanation. It will, however, be understood that other scenarios are possible. The applications program 160 running in the user address space 150 wishes to produce data about the resources of the sysplex 10. In the prior art, the applications program 160 would have interrogated the SMF data sets 40 or the monitor III data sets 60 running in the same operating system. However in the system of the described invention, there is now a plurality of operating system images 20 and the applications program 160 runs on only one of the operating system images—in the described embodiment of FIG. 4 only on operating system image 20*b*, although it could have been running on any other operating system image. The applications program 160 must therefore make use of the sysplex data server 170.

As described earlier, the sysplex data server 170 is always running in the first measurement facility address space 30 when the resource measurement facility is running in the operating system image 20. In particular, a sysplex data server 170 must be running in the operating system image 20 in which the applications program 160 is running.

Figure 11:
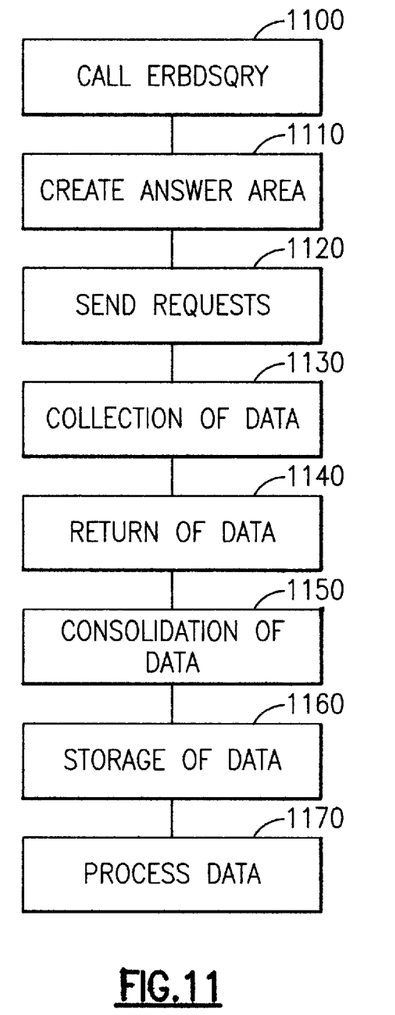
FIG. 11 is a flow chart showing the call of the ERBDSQRY GUPI.

In step 1100 on FIG. 11, the applications program 160 calls the ERBDSQRY service which is supplied by the sysplex data server 170 as a GUPI. The applications program 160 must provide to the GUPI the values of the parameters required (see above). The applications program 160 creates within the user address space 150 or in a public address and data space an answer area 600 for the data to be returned from ERBDSQRY service. The address of the created answer area 600 and its length are given in the ANSWER_AREA_ADDR, ANSWER_AREA_ALET and ANSWER_AREA_LENGTH parameters (step 1110). The applications program 160 must also supply a list of the names of the operating system images 20 from which it desires the data. This list is given in the SMF_SYSTEM_NAME_LIST and the SMF_SYSTEM_NAME_INFO parameters. The sysplex data server 170 must be operating on all of the named operating system images 20, otherwise an error message will be indicated by the RETURN_CODE and REASON_CODE parameters on return from the call. The applications program 160 must also specify the type of data that is to be collected. This is given by the REQUEST_TYPE, START_TIME, END_TIME and SMF_RECORD_TYPE_INFO parameters as described before.

In step 1120, the sysplex data server 170 originating the called ERBDSQRY service sends requests for the data through the connections 410 to the sysplex data servers 170 running on the operating system images 20 specified by the SMF_SYSTEM_NAME_LIST and SMF_SYSTEM_NAME_INFO parameters. In step 1130, the sysplex data servers 170 interrogate the SMF data sets 40 and/or the monitor III data sets 60 running in the same operating system image 20. In those operating system images 20 in which a match with the search criteria is found, the sysplex data servers 170 will return (step 1140) to the originating sysplex data server 170 the SMF record headers 652 and, if requested, the RMF product section 655, from the SMF records 310.

In step 1150, the originating sysplex data server 170 consolidates the information and assigns a record token 650 to each of the returned SMF record headers 652. The common header 601 (FIG. 6A) is created for the returned information and the header, together with the returned SMF record headers 652, RMF product section records 655 and record tokens 650 are stored (step 1160) in the answer area created in step 1110. The structure of the data section is shown in FIG. 6B and FIG. 6C.

The RETURN_CODE and REASON_CODE parameters from the ERBDSQRY GUPI are used in order to signal errors or problems arising from the ERBDSQRY GUPI, e.g. when the length of the answer area 600 assigned by the ANSWER_AREA_LENGTH parameter is smaller than that required and indicated by the LEN block 610 of the common header shown in FIG. 6A.

The applications program 160 can now process the information stored in the created answer area 600. A typical use of the information would be to request SMF record data from each of the data buffers 40 on each operating system image 20. For this purpose, the sysplex data server 170 is supplied with the ERBDSREC service which provides the ERBDSREC GUPI. The call of this service by the applications program 160 will now be described with the help of FIG. 12.

Figure 12:
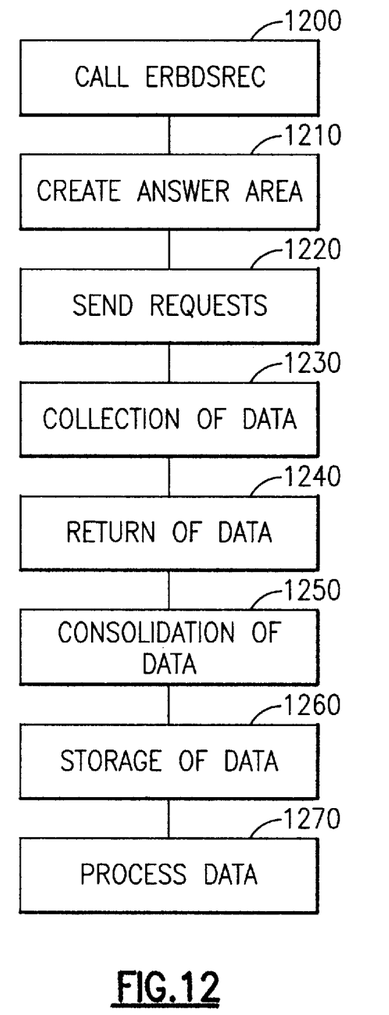
FIG. 12 is a flow chart showing the call of the ERBDSREC GUPI.

In step 1200 the applications program 160 calls the ERBDSREC service of the sysplex data server 170. The format of the ERBDSREC call is described in FIG. 7. It includes parameters (ANSWER_AREA_ADDR, ANSWER_AREA_ALET, ANSWER_AREA_LENGTH) for describing the position and length of the ERBDSREC answer area 800 which is created wither within the user address space 150 or within a public address and data space. These parameters are used in step 1210 for creating the ERBDSREC answer area 800. With the ERBDSREC call is passed a list of record tokens 650 created by the ERBDSQRY call and stored in the ERBDSQRY answer area 600. These record tokens 650 indicate the SMF records which are requested by the applications program 160.

In step 1220 the sysplex data server 170 passes to the sysplex data servers 170 of the operating system images 20 indicated by the record tokens 650 requests for the collection of data which is carried out in step 1230. The step 1230 of collection of data is carried out by the sysplex data servers 170 in the operating system images 20. The SMF data is obtained from the first plurality of data sets 40. The collected SMF data is returned to the requesting sysplex data server 170 where a header is created (FIG. 6A) and the data is consolidated (step 1250) and stored (step 1260) in the answer area 800 (FIG. 8). The data may be subsequently processed from the answer area 800 by the applications program 160 or by another program.

The use of the ERB3XDRS GUPI is carried out in a similar manner to that of the ERBDSREC GUPI except that Monitor III data is requested and stored in an answer area 1000 as shown on FIG. 10.

In a further embodiment of the invention the measurement facility processor 110 shown in FIG. 1 can run on the same operating system image 20 as the address spaces in which the answer area 800 from the ERBDSQRY call and the answer area 1000 from the ERB3XDRS call are to be found. The measurement facility processor 110 takes the available data and produces reports and figures based on the data thus allowing a system administrator to identify problems in the system. The measurement facility processor 110 produces reports about:

Cross-system coupling facility delays: The delay report presents information about jobs in one operating system image 20 waiting for services from other operating system images 20. The tabular form of the report also lists explanations for the delay.

Delay Report: The delay report (for all jobs) shows the activity of each job in the system and the hardware and software resources that are delaying each job. For all delays, the tabular form of the report also list the primary reason for the delay.

Device Delays: The device delays report presents information about jobs contending for device volumes, such as direct access storage devices (DASD), tapes, or a mass storage controller (MSC) volume.

Device Resource Delays: The resource-oriented device delays report presents information about the activity of input/output devices that are delaying jobs.

Enqueue Delays: The enqueue delays report presents information about jobs that are waiting to use (enqueued on) serially reusable resources. The tabular display also lists the percentage of time that enqueue contention delayed the job over the report interval and the jobs that held the resource while the delayed job was waiting.

Enqueue Resource Delays: The resource-oriented delays report presents information about serially reusable resources causing contention in the system. The tabular form of the report also lists the names of jobs that are delayed for (enqueued on) these resources, and the names of the jobs that are holding these resources.

Hierarchical Storage Manager (HSM) Delays: The HSM delays report presents information about jobs waiting for services from HSM. The tabular form of the report also lists explanations for the delay.

JES Delays: The JES delays report presents information about jobs waiting for services from JES2 or JES3. The tabular form of the report also lists explanations for the delay.

Job Report: The job report presents information about why a job is delayed. The information in the report describes the primary or requested delay reason and provides possible causes leading to the job delay.

Processor Delays: The processor delays report presents information about all jobs delayed for or using a processor during the report interval.

Storage Delays: The storage delays report presents information about all jobs that used frames and the central and expanded storage working set sizes the jobs used during the report interval. If a job was delayed because of paging or swapping activity, the report also identifies the reason for the delay.

Storage Delay Summary: The storage summary report provides information on storage usage for each domain and performance group.

Storage Frames: The storage frames report provides information on frame counts for each address space. The report also provides information on the auxiliary slot count and page-in rate, including the rate of page-ins from expanded storage.

Storage Resource Delays: The resource-oriented storage delays report presents information about system storage usage and paging space delay by volume serial.

System Information Report: The system information report provides an overview of the sysplex 10, its workload, and the total number of jobs using resources or delayed for resources. The system information report can report measurements for the entire sysplex 10 and for the following group of jobs: TSO, batch, started tasks, domains, and performance groups.

Workflow/Exceptions Report: The workflow/exceptions report presents information about system activity and system resources. The first part of report shows the speed at which jobs move through the sysplex. The second part of the report shows jobs that meet the specified exception criteria. A graphic report can be produced to represent the workflow in speedometers.

What is claimed is:

1. In a sysplex having a plurality of operating system images, a reporter facility for reporting data from said sysplex, and one or more data groups in the operating system images containing reportable data, apparatus for providing said reportable data to said reporter facility, comprising:

a first data server in a first one of said operating system images;

one or more additional data servers in one or more of said operating system images with said data groups containing reportable data;

means in said first data server for sending a request to collect reportable data to one or more of said additional data servers, said request containing search criteria specifying said data:

means in said additional data servers responsive to the receipt of a request from said first data server to collect reportable data for collecting the reportable data from said data groups matching said search criteria and returning said reportable data to said first data server; and means in said first data server for passing said returned reportable data to said reporter facility.

2. The apparatus of claim 1 comprising a plurality of data groups in each operating system image, said request to collect reportable data indicating in which of said data groups said reportable data is present.

3. The apparatus of claim 1 wherein said first data server creates an answer area into which the reportable data is stored.

4. The apparatus of claim 1 wherein said reporter facility comprises a monitoring facility for monitoring the resources in said sysplex, said data groups including data relating to the use and load of resources within said sysplex.

5. A method for reporting data in a sysplex with a plurality of operating system images comprising the steps of:

sending from a first one of said operating system images a request for collecting reportable data to other ones of said operating system images, said request containing search criteria specifying said data;

in response to the receipt of said request from said first one of said operating system images, collecting the reportable data in said other ones of said operating system images matching said search criteria and returning said reportable data to said first one of said operating system images; and storing said returned reportable data in an answer area in said first one of said operating system images.

6. A method for reporting data in a sysplex with a plurality of operating system images comprising the steps of:

sending from a first one of said operating system images a request with search criteria for establishing in which ones of said operating system images reportable data is present;

in response to the receipt of said request from said first one of said operating system images, matching said search criteria with said reportable data in said operating system images and returning an image list of operating system images in which said reportable data is present to said first one of said operating system images;

using said Image list for sending from said first one of said operating system images to the listed operating system images a request for collecting the reportable data in said listed operating system images;

in response to the receipt of said latter request from said first one of said operating system images, collecting said reportable data in said listed ones of said operating system images and returning said reportable data from said listed ones of the operating system images to said first one of said operating system images; and storing said returned reportable data in an answer area in said first one of said operating system images.

* * * * *